(12) United States Patent
Gordon

(10) Patent No.: US 7,394,850 B1
(45) Date of Patent: Jul. 1, 2008

(54) METHOD AND APPARATUS FOR PERFORMING DIGITAL-TO-DIGITAL VIDEO INSERTION

(75) Inventor: Donald F. Gordon, Los Altos, CA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 602 days.

(21) Appl. No.: 09/695,898

(22) Filed: Oct. 24, 2000

Related U.S. Application Data

(60) Provisional application No. 60/161,320, filed on Oct. 25, 1999.

(51) Int. Cl.
*H04N 7/12* (2006.01)
(52) U.S. Cl. .................................. 375/240.01
(58) Field of Classification Search ............ 375/240.01, 375/240.28; *H04N 7/12*
See application file for complete search history.

(56) References Cited

U.S. PATENT DOCUMENTS

| | | | | |
|---|---|---|---|---|
| 5,534,944 | A | 7/1996 | Egawa et al. ................. | 348/584 |
| 5,982,436 | A | 11/1999 | Balakrishanan et al. ..... | 348/409 |
| 6,005,620 | A | * 12/1999 | Yang et al. ............. | 375/240.28 |
| 6,038,000 | A | 3/2000 | Hurst, Jr. .................... | 348/845 |
| 6,067,303 | A | 5/2000 | Aaker et al. ................ | 370/474 |

FOREIGN PATENT DOCUMENTS

| | | |
|---|---|---|
| EP | 0 739 138 A | 10/1996 |
| EP | 0 944 249 A | 9/1999 |
| EP | 00 97 5371 | 9/2005 |
| WO | WO 99/39506 A | 8/1999 |

\* cited by examiner

*Primary Examiner*—Young Lee
(74) *Attorney, Agent, or Firm*—Patterson & Sheridan, LLP

(57) ABSTRACT

Techniques for seamlessly inserting a second compressed video stream (e.g., for an advertisement) into a first compressed video stream (e.g., for a program video), which can be implemented in an ad insertion processor that typically includes a real time encoder (e.g., an MPEG encoder), a buffer, a profiler, a multiplexer, and a splicer. The profiler receives the first compressed video stream and provides a "profile" for the stream, which may include bit rate and other information about the stream. The real time encoder receives and encodes a second video in accordance with a particular encoding scheme to generate the second compressed video stream. The real time encoder further controls the encoding of the second video based at least in part on the profile of the first compressed video stream such that the profiles for the two streams are approximately similar at the point in time the second stream is inserted into the first stream. The buffer stores the first compressed video stream from the real time encoder until it is needed. The multiplexer inserts the second compressed video stream into the first compressed video stream, and the splicer splices the two streams together to form the output video stream.

14 Claims, 4 Drawing Sheets

METHOD AND APPARATUS FOR PERFORMING DIGITAL-TO-DIGITAL VIDEO INSERTION

CROSS-REFERENCES TO RELATED APPLICATIONS

This application claims the benefit of U.S. provisional Application Ser. No. 60/161,320, entitled "METHOD AND APPARATUS FOR PERFORMING DIGITAL-TO-DIGITAL VIDEO ADVERTISEMENT INSERTION," filed Oct. 25, 1999, which is incorporated herein by reference in its entirety for all purposes.

BACKGROUND OF THE INVENTION

The invention relates generally to digital video processing and more specifically to a method and apparatus for inserting a compressed digital advertisement video into a compressed digital program video.

In modern television programming, it is desirable to seamlessly insert advertising information into a program video such that a viewer does not observe unsightly artifacts or other anomalies on a television screen when the program transitions into an advertisement or vice versa. The process by which advertisement is spliced into a program video is known as "ad insertion". Conventionally, ad insertion is typically achieved by merging an analog advertisement video into an analog program video (which is also known as a "digital-into-analog" process). This insertion technique works by switching between (advertisement and program) video sources and broadcasting the multiplexed video to the viewer. If the advertisement is stored in a digital format, it is typically converted into an analog advertisement video prior to the ad insertion. Frame synchronization is typically a major concern in such an analog-based system, and other issues are not quite as critical. Since the video signal being broadcast is analog, the ad insertion equipment produces the multiplexed video in analog format regardless of whether the advertisement is stored in analog or digital format.

As television transmission systems switch to compressed digital formats, the need to insert advertisement using a "digital-into-digital" process becomes obvious. The digital-into-digital process achieves ad insertion by switching between compressed advertisement and program video streams and broadcasting the multiplexed output video stream to the viewer. Conventional solutions for the digital-into-digital process, however, are fraught with problems since video compression schemes such as the ones defined by the Moving Pictures Expert Group (MPEG) standard focuses mainly on the relationships between frames of video and packets of audio.

Splicing in the compressed digital domain to achieve ad insertion generally cannot be accomplished with the same degree of freedom as in the analog domain or in the uncompressed digital domain. The profile (or characteristics, which typically include the bit rate) of a compressed video stream continually changes over time depending on the contents of the video, the parameter values used to encode the video, and other factors. Unless care is taken to ensure that the splicing is accomplished at the proper points within the compressed video stream and with matched encoding profiles for the compressed streams to be merged, various unsightly artifacts or other anomalies can result in the multiplexed output video. Such artifacts and anomalies may include, for example, severe macroblocking, dropped frames, macroblock panics, audio glitches, pop gargling noises, drop outs, and so on.

Therefore, digital-into-digital ad insertion techniques that seamlessly merge compressed digital advertisement video into compressed digital program video are highly desirable.

SUMMARY OF THE INVENTION

The invention provides ad insertion techniques that overcome disadvantages normally associated with conventional ad insertion techniques and can be used to seamlessly merge compressed digital advertisement video into compressed digital program video. The techniques of the invention utilize program video "profiling" to ensure that the digitally encoded advertisement video (i.e., compressed advertisement video) has a profile that is similar to that of the compressed digital program video at approximately the time the compressed advertisement video is inserted into the compressed program video. By using the techniques of the invention, the video decoder (e.g., in the subscriber equipment) can seamlessly decode both the program and advertisement without producing visible artifacts on the display during or after the transition from program to advertisement or advertisement to program.

The techniques of the invention can be advantageously applied in a digital information distribution system such as a video on demand system or a server-centric interactive program guide system. Such information distribution system may include service provider equipment, a data distribution network, and subscriber equipment that typically includes a video decoder and a display.

An embodiment of the invention provides an ad insertion processor (which typically resides in the service provider equipment) capable of seamlessly inserting a second compressed (e.g., advertisement) video stream into a first compressed (e.g., program) video stream. The ad insertion processor includes a real time encoder (e.g., an MPEG encoder), a profiler, and a multiplexer, and typically further includes a buffer. To process a number of program and advertisement videos, the ad insertion processor is typically implemented with a number of real time encoders, buffers, profilers, and multiplexers.

The profiler receives the compressed program video stream and provides a profile for this stream. The profile is typically in the form of a continuous information stream that includes bit rate information (e.g., a high and low bit rate value and a mean bit rate value) and may further include VBV (video buffering verifier) buffer information used for the compressed video stream. The profiling information for the compressed program video stream is used to facilitate the splicing of the compressed advertisement video stream into the compressed program video stream in a seamless manner.

An advertisement video source provides a number of advertisement videos. Upon receiving a control signal (e.g., a "pre-roll" signal that typically occurs six seconds before the advertisement is needed), the ad insertion source provides a selected advertisement video to the real time encoder.

The real time encoder receives and encodes the advertisement video in accordance with a particular encoding scheme to generate the compressed advertisement video stream. The real time encoder further controls the encoding of the advertisement video based at least in part on the profile of the compressed program video stream such that the profile of the compressed advertisement video stream approximately matches the profile of the compressed program video stream at the point in time the advertisement video is inserted into the program video.

The buffer may be utilized to buffer the compressed advertisement until it is needed by the multiplexer (e.g., to buffer six seconds of video). The buffer can provide the compressed advertisement video to the multiplexer upon receiving another control signal (e.g., a "roll" signal).

The multiplexer receives the compressed advertisement and program video streams and inserts the compressed advertisement video stream into the compressed program video stream. This can be achieved by switching from the compressed program video stream to the compressed advertisement video stream, splicing the streams together, and providing the spliced stream as an output video stream. By using feedback of the profile of the compressed program video to control the encoding of the advertisement video, when the multiplexer switches from the compressed program video to the compressed advertisement video, the switching appears seamless at a decoder.

The profiler further collects information regarding the profile of the compressed advertisement video such that the encoding parameters for the advertisement can be adjusted to ensure that the profile of the compressed advertisement video is similar to that of the compressed program video at the time the program video was interrupted to insert the advertisement video. In this manner, the transition back to the compressed program video from the compressed advertisement video will also be seamless.

The invention further provides other systems and methods that implement, process, and/or facilitate the ad insertion techniques described herein.

The foregoing, together with other aspects of this invention, will become more apparent when referring to the following specification, claims, and accompanying drawings.

BRIEF DESCRIPTION OF THE DRAWINGS

The teachings of the invention can be readily understood by considering the following detailed description in conjunction with the accompanying drawings.

DESCRIPTION OF THE SPECIFIC EMBODIMENTS

Figure 1:
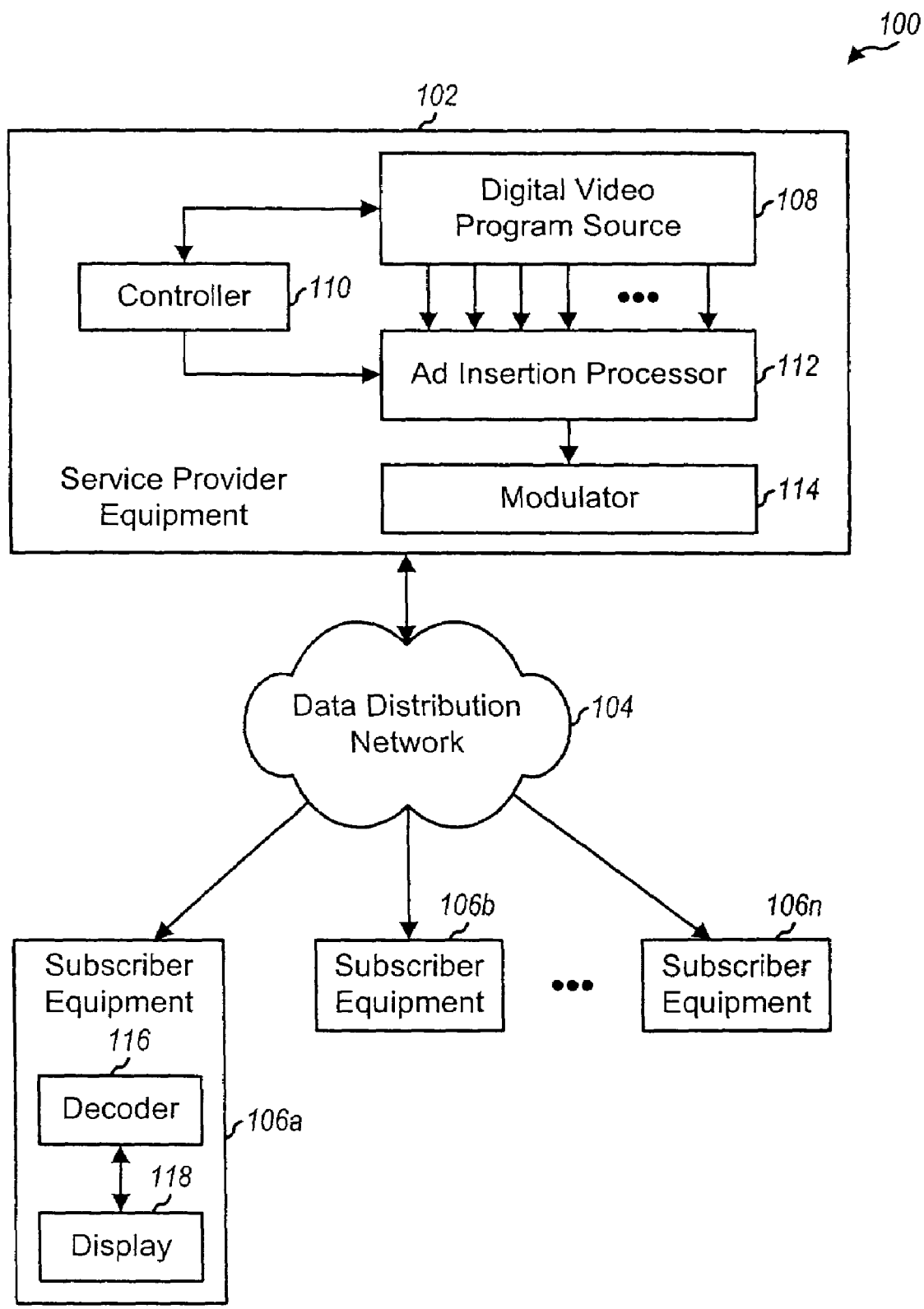
FIG. 1 depicts a block diagram of a digital information distribution system capable of implementing various aspects of the invention.

FIG. 1 depicts a block diagram of a digital information distribution system 100 capable of implementing various aspects of the invention. System 100 includes service provider equipment 102, a data distribution network 104, and subscriber equipment 106. In an embodiment, service provider equipment 102 includes a digital program video source 108 (which may be implemented with a video server), a controller 110, an ad insertion processor 112, and a modulator 114 (which may be implemented as a quadrature amplitude modulation (QAM) modulator). Service provider equipment 102 couples to data distribution network 104, which may be a hybrid fiber-coax network. Subscriber equipment 106 also couples to network 104 and includes a video decoder 116 (e.g., an MPEG decoder) and a display device 118 (e.g., a television set).

Digital program video source 108 provides a number of streams of compressed digital program video to ad insertion processor 112. As used herein, the term "compressed digital program video" or "compressed video" includes the associated digital audio information, which may or may not be compressed. The compressed program video streams from source 108 may be MPEG-compliant streams. However, streams produced using other encoding schemes can also be processed in accordance with the techniques of the invention.

Ad insertion processor 112 generates a number of compressed advertisement video streams, inserts the compressed advertisement video streams into the compressed program video streams, and provides one or more output video streams to modulator 114. Modulator 114 then modulates the output video streams onto one or more carriers, and the modulated signals are transmitted via data distribution network 104 to subscriber equipment 106. Subscriber equipment 106 demodulates the signal, decodes a selected video stream using video decoder 116, and provides the decoded video to display 118.

Ad insertion processor 112 provides a seamless transition between the compressed program video that is distributed to the subscribers and the compressed advertisement video that is inserted into the compressed program video, and is described in further detail below. Controller 110 provides the control signals for the insertion of the compressed advertisement video into the compressed program video.

Figure 2:
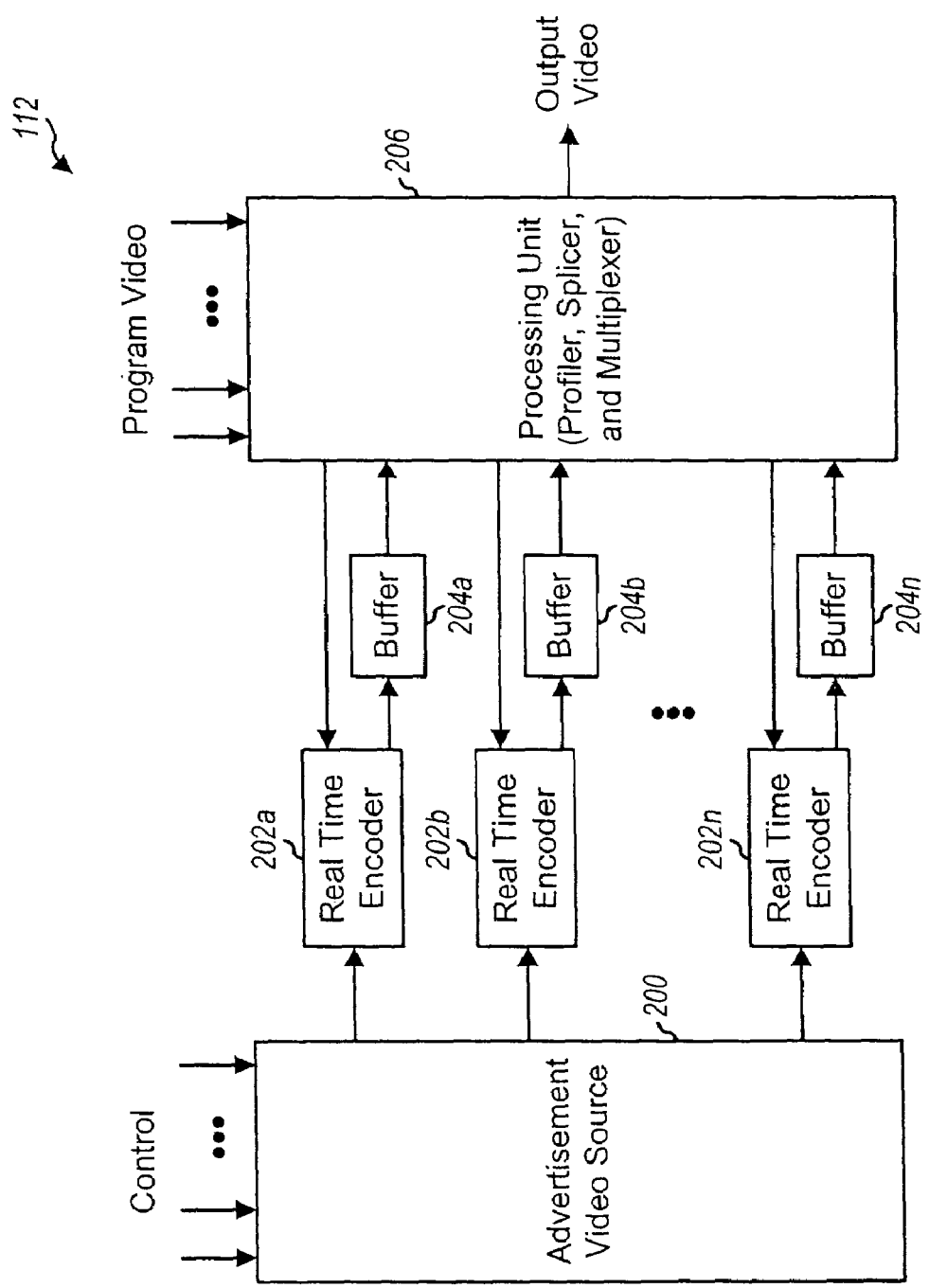
FIG. 2 depicts a block diagram of an embodiment of an ad insertion processor in accordance with an embodiment of the invention.

FIG. 2 depicts a block diagram of an embodiment of ad insertion processor 112. In this embodiment, ad insertion processor 112 includes an advertisement video source 200, a number of real time (one or more) encoders 202, a number (one or more) of buffers 204, and a processing unit 206. In an embodiment, processing unit 206 includes a profiler, a splicer, and a multiplexer.

Advertisement video source 200 provides the advertisements to be inserted into the program videos. Advertisement video source 200 may be implemented with a server coupled to a bulk storage device (e.g., a disk drive, magneto-optical drive, or some other storage device) used to store a large number of advertisements that can be selectively retrieved. The stored advertisements may be in a particular format and may conform to, for example, the CCIR-601 video standard. Advertisement video source 200 receives from controller 110 control information identifying when an advertisement should be inserted into the compressed program video stream, and uses the control information to initiate the processing (e.g., encoding) of the advertisement. At the designated times, the selected advertisements are streamed out of advertisement video source 200 to the assigned real time encoders 202 on a frame-by-frame or sub-frame (slice) basis.

Each real time encoder 202 may be assigned to encode a particular advertisement video from advertisement video source 200 or any number of encoders (e.g. two) can be used to encode the advertisement videos where each advertisement video time-shares the available encoders. Real time encoders 202 then provide the compressed advertisement video streams to respective buffers 204, which buffer the compressed streams until they are needed.

Processing unit 206 receives a number of compressed program video streams (e.g., from program video source 108). For each compressed program video stream to be inserted with advertisements, the profiler within processing unit 206 provides a profile for the compressed stream. Processing unit 206 further receives compressed advertisement video streams from buffers 204 and inserts the advertisements into the proper program videos.

Figure 3:
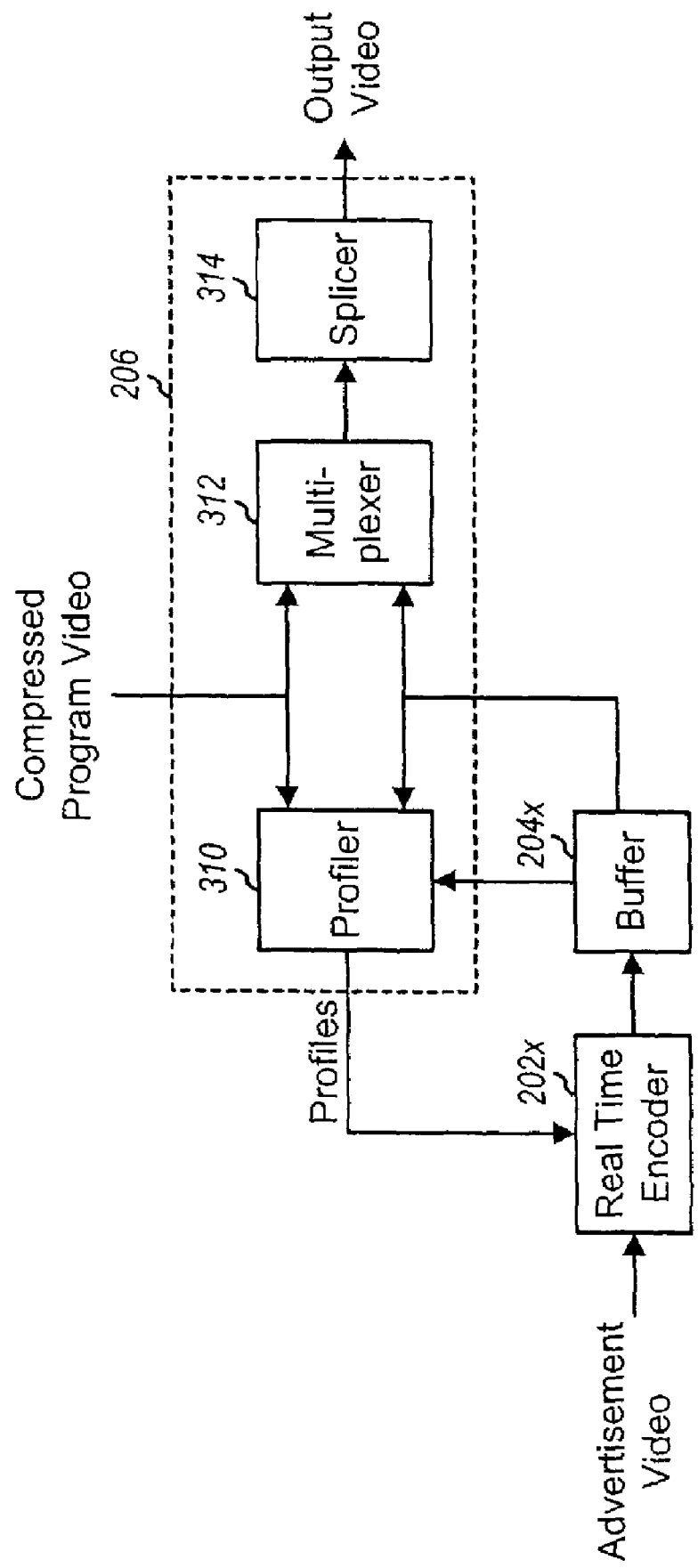
FIG. 3 is a more detailed block diagram of an embodiment of a portion of the ad insertion processor of FIG. 2, which can be used to splice an advertisement video into a program video.

FIG. 3 is a more detailed block diagram of an embodiment of a portion of ad insertion processor 112, which is used to splice an advertisement video into a compressed program video stream. As shown in FIG. 3, the compressed program video is provided to a profiler 310 and a multiplexer 312 within processing unit 206.

Profiler 310 provides information regarding the profile of the compressed program video stream. This profile typically comprises information pertaining to various parameters associated with the compressed stream such as, for example, bit rate information, VBV (video buffering verifier) buffer information that is typically used for MPEG encoding, intra DC coefficient precision, group of pictures (GOP) prediction format, and so on. The bit rate information may include, for example, a high bit rate value, a low bit rate value, and a mean bit rate value for the compressed stream. As used herein, the term "profile" includes the context represented by "levels" in MPEG standard and it is not bound to the defined profile & level definitions and combinations used in MPEG standard. In general, a number of parameters are selected as representative of the program video stream encoding scheme and these parameters are continuously tracked by the profiler 310 for any instant parameter changes in the program bitstream. The profile information for the compressed program video is provided (i.e., fed back) to a real time encoder 202x assigned to encode the advertisement video to be inserted into that program video.

As shown in FIG. 3, real time encoder 202x encodes the advertisement video in accordance with a particular encoding scheme to generate the compressed advertisement video stream. Real time encoder 202x may be implemented as an MPEG-2 encoder that generates an MPEG-compliant stream. Alternatively, real time encoder 202 may be designed to encode the advertisement video using some other encoding scheme. Typically, real time encoder 202x implements the same encoding scheme used to generate the compressed program video stream.

The encoding of the advertisement can begin a particular "pre-roll" time period (e.g., six seconds) prior to the time the advertisement is to be inserted into the compressed program video. The encoding start time can be indicated by a "pre-roll" signal that is received by controller 110 and which indicates that the advertisement will be needed in approximately that pre-roll time period (e.g., in six seconds). Controller 110 then notifies ad insertion processor 112 to produce the compressed advertisement video within that pre-roll time period. Thus, upon receiving the pre-roll signal, advertisement video source 200 can begin streaming frames or slices of the advertisement video to the assigned real time encoder 202x, which compresses the advertisement.

The encoding is typically initiated a short time (e.g., the pre-roll time) prior to the time at which the compressed video stream will be needed. This allows the real time encoder a sufficient amount of time to adjust the encoding parameters and then encode the advertising content.

The compressed advertisement video stream is then provided to an associated buffer 204x, which buffers the compressed advertisement video for that pre-roll time period (e.g., six seconds). If real time encoder 202x is capable of rapidly encoding video, buffer 204x may not be needed and, in that case, encoder 202x may be coupled directly to multiplexer 312 within processing unit 206.

In an implementation, a "roll" signal by controller 110 informs that the advertisement is to be inserted into the program video in a particular roll time period (e.g., one second). If buffer 204x is not employed, encoder 202x can begin encoding the advertisement video at this time and directly provide the compressed advertisement video stream to multiplexer 312.

At the specific point in time the compressed advertisement video is to be inserted into the compressed program video, multiplexer 312 switches from the compressed program video stream to the compressed advertisement video stream. Splicer 314 then splices the compressed advertisement video stream to the compressed program video stream to generate a compressed output video stream.

Prior to the time the advertisement video is inserted into the compressed program video stream, the profiling information that characterizes the compressed program video is provided (i.e., fed back) to real time encoder 202x used to encode the advertisement video for this program video. The profile is then used to adjust the encoder parameters to ensure that the profile of the compressed advertisement video approximately matches the profile of the compressed program video at the point when multiplexer 312 switches stream and the compressed advertisement video is inserted into the compressed program video. Since the advertisement video has been compressed to ensure that the profile of the compressed advertisement video stream is similar to that of the compressed program video stream, the insertion of the advertisement into the program video appears seamless.

Various encoding parameters for the advertisement video can be adjusted based on the profile of the compressed program video. For example, the quantization step size used in the encoding process can be adjusted to achieve the desired profile. The quantization step size can be decreased if a higher bit rate is needed and can be increased if a lower bit rate is required. The VBV buffer information can also be used in the encoding process to ensure that the multiplexed output video stream will not cause buffer overflow or underflow at the decoder. These adjustments of the encoding process are known in the art and not described in further detail herein.

The contents of the program video may be very different from that of the advertisement video and this may result in a difference in picture quality (as measured by the signal-to-noise ratio) for the same profile. In an embodiment, for a particular period of time (e.g., several seconds) near a splicing point, the quality of the advertisement video can be matched to that of the program video. This matching of the picture quality of the two videos to be spliced can be achieved by adjusting the profile parameters.

In an embodiment, while the compressed advertisement video is streamed to multiplexer 312 (after the advertisement video has been spliced to the program video stream), profiler 310 collects profile parameter information according to which the encoding parameters are adjusted. Profile parameters such as the instantaneous bit rate of the advertising video stream are adjusted so that the profile parameter values closely matches program video parameters at the time the program video was interrupted. This is particularly important at the time the advertising video ends and is transitioned back to program video. The use of the profile to continuously adjust the encoding parameters of the advertisement video ensures that the splicing of the program video back into the advertisement appears seamless.

A number of advertisements may be inserted sequentially into the program video using the techniques described above. In an embodiment, the advertisements may be encoded one after another using a number of real time encoders 202 that may be arranged in a cascade configuration. Each advertisement may be encoded based on the profile obtained for the program video into which the advertisement is to be inserted. Multiplexer 312 can switch from one encoded advertisement video stream to another until all advertisements have been inserted. At the end of the advertisements, multiplexer 312 switches back to the compressed program video stream. The profile of the compressed program video is used to adjust the encoder parameters for the advertisements and to ensure that the last advertisement to be encoded has a profile that approximately matches the profile of the compressed program video at the point in time the program video was paused to insert the first advertisement. In this manner, the advertisement videos can be seamlessly inserted into the program video. In addition to the last advertisement video, the first advertisement video may also be encoded with the same profile as the compressed program video to provide seamless transition.

In an alternative embodiment, the advertisements may be encoded one after another using only one real time encoder 202. Again, the encoding of each advertisement can be controlled based on the profile of the compressed program video to ensure a seamless transition between the advertisements and the program video.

Because the profile of the compressed program video stream was used to encode the advertisements inserted into the program video, the decoder within the subscriber equipment is able to properly decode the multiplexed output video stream without producing artifacts and anomalies on the video display. Since the profile of the inserted advertisement is similar to that of the program video, the decoding parameters and the decoder buffer are well behaved (e.g., no buffer overflow). Thus, the decoder can seamlessly transition from decoding the compressed program video stream to decoding the compressed advertisement video stream.

In the above description, the program video is received in compressed form and the advertisement video is encoded based on the profile of the compressed program video. In other embodiments, the program video can also be received in uncompressed form. In this case, the program video can be encoded in the normal manner and the profile for the advertising video can be generated as described above.

For clarity, various aspects of the invention are described for insertion of advertisement video into program video. The techniques described herein can also be adapted for encoding and inserting (i.e., splicing) any types of video or other source materials (e.g., audio, and so on). Moreover, the techniques described herein can be used to splice together compressed streams for portions of frames of videos (e.g., to splice a first compressed stream for the upper half of the frame with a second compressed stream for the lower half of the frame).

Figure 4:
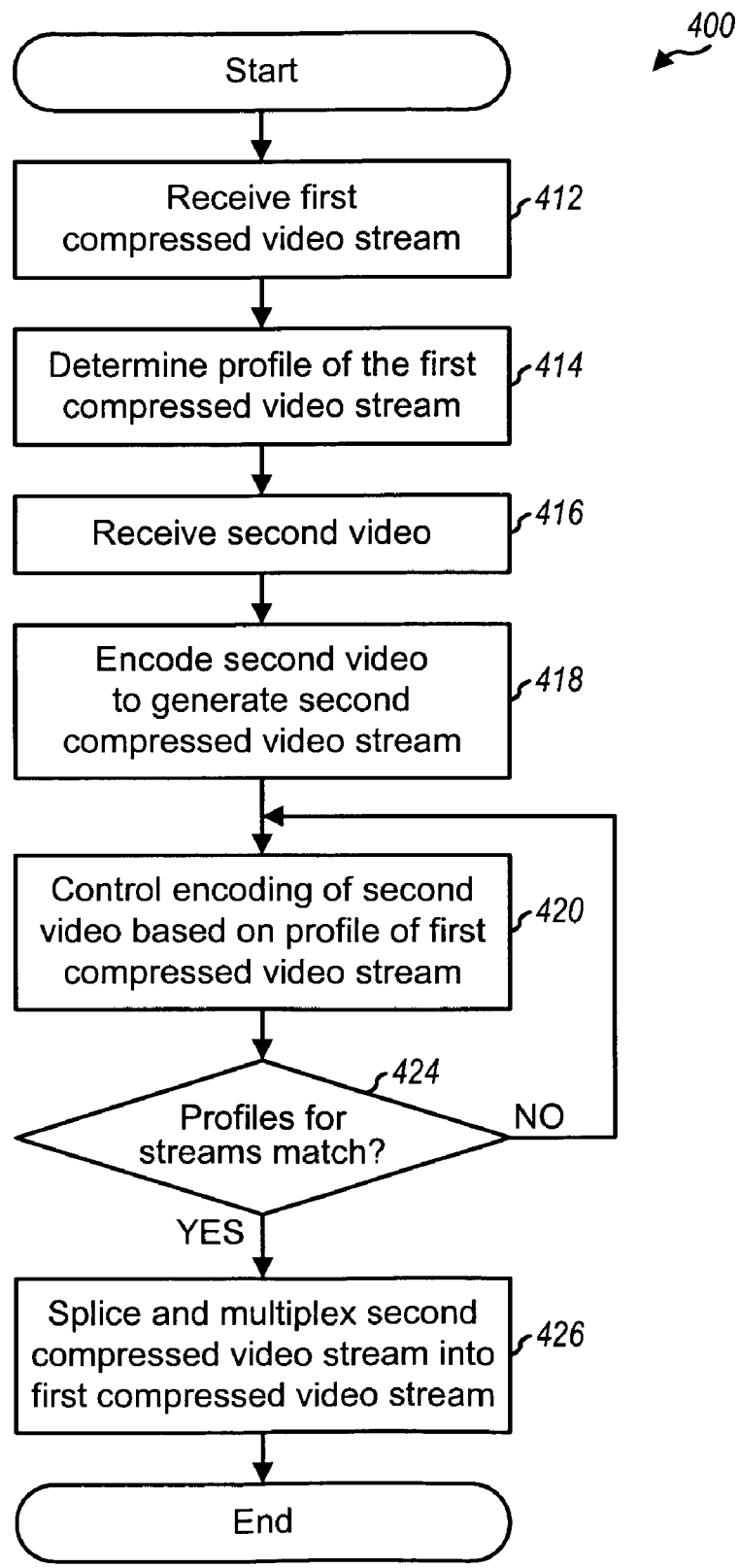
FIG. 4 is a flow diagram of a video insertion process in accordance with an embodiment of the invention.

FIG. 4 is a flow diagram of a video insertion process 400 in accordance with an embodiment of the invention. Video insertion process 400 can be used to insert a second compressed video stream (e.g., for an advertisement) into a first compressed video stream (for a program video). Initially, the first compressed video stream is received, at step 412, and a profile for the stream is determined, at step 414. The profile can include the information described above.

A second video is then received, at step 416, and encoded in accordance with a particular encoding scheme and further based on the profile of the first compressed video stream to generate the second compressed video stream, at step 418. The encoding of the second video is controlled continuously based at least in part on the profile of the first compressed video stream, at step 420. The encoding can be initiated prior to the time the second compressed video stream is needed, and the encoding can be adjusted such that the profiles for the first and second compressed video streams approximately match. If the profiles for the streams do not match (within the requisite degree), the encoding parameters are further adjusted back at step 420. Otherwise, if the profiles approximately match, the second compressed video stream can be spliced and multiplexed into the first compressed video stream, at step 426.

The foregoing description of the preferred embodiments is provided to enable any person skilled in the art to make or use the invention. Various modifications to these embodiments will be readily apparent to those skilled in the art, and the generic principles defined herein may be applied to other embodiments without the use of the inventive faculty. Thus, the invention is not intended to be limited to the embodiments shown herein but is to be accorded the widest scope consistent with the principles and novel features disclosed herein.

What is claimed is:

1. A method comprising:
   receiving a first compressed video stream;
   determining a first encoding profile for the first compressed video stream;
   encoding a second video stream in accordance with an encoding parameter associated with the first compressed video stream to generate a second compressed video stream having a second encoding profile which matches the first encoding profile to within a requisite degree, wherein a profiler continuously tracks the encoding parameter associated with the first compressed video stream for instant parameter changes;
   splicing the second compressed video stream into the first compressed video stream to produce a spliced stream,
   wherein the requisite degree of matching between the second encoding profile and the first encoding profile is selected such that the spliced video stream can be decoded without producing visible artifacts on a display during or after a transition from a first compressed video stream portion of the spliced stream to a second compressed video stream portion of the spliced stream,
   wherein the encoding of the second video is controlled such that the second encoding profile approximately matches the first encoding profile at approximately a point in time when the second compressed video stream is spliced into the first compressed video stream,
   wherein the encoding of the second video is further controlled such that the second encoding profile approximately matches the first encoding profile at approximately a point in time when the first compressed video stream is spliced back into the spliced stream.

2. The method of claim 1, further comprising:
   determining the second encoding profile for the second compressed video stream.

3. The method of claim 1, wherein splicing includes
   initially multiplexing the first compressed video stream as an output video stream;
   multiplexing the second compressed video stream as the output video stream at a point in time when the inserting is to be achieved; and
   splicing the second compressed video stream to the first compressed video stream.

4. The method of claim 1, further comprising:
   receiving a control signal indicative of a time period within which the splicing is to be performed; and
   initiating the encoding of the second video stream in response to receiving the control signal.

5. The method of claim 4, further comprising:
   buffering the second compressed video stream prior to splicing.

6. The method of claim 1, wherein the second video relates to an advertisement and the first compressed video stream relates to a program video.

7. The method of claim 1, wherein the first encoding profile includes bit rate information related to the first compressed video stream.

8. The method of claim 7, wherein the bit rate information includes a high bit rate, a low bit rate, and a mean bit rate determined over a particular time period.

9. The method of claim 7, wherein the first encoding profile further includes video buffering verifier (VBV) buffer information used for the encoding.

10. The method of claim 1, wherein the second video is encoded in accordance with an MPEG encoding scheme.

11. A system operative to splice a second compressed video stream into a first compressed video stream, comprising:
 a profiler configured to receive the first compressed video stream and to provide a first encoding profile for the first compressed video stream;
 a real time encoder coupled to the profiler and configured to receive and encode a second video in accordance with an encoding parameter associated with the first compressed video stream to generate the second compressed video stream having a second encoding profile matching the first encoding profile to within a requisite degree, wherein the profiler continuously tracks the encoding parameter associated with the first compressed video stream for instant parameter changes; and
 a multiplexer and splicer operatively coupled to the real time encoder and operative to receive the second and first compressed video streams, to splice the second compressed video stream into the first compressed video stream,
 wherein the requisite degree of matching between the second encoding profile and the first encoding profile is selected such that the spliced video stream can be decoded without producing visible artifacts on a display during or after a transition from a first compressed video stream portion of the spliced stream to a second compressed video stream portion of the spliced stream,
 wherein the real time encoder is further configured to control the encoding of the second video such that the second encoding profile approximately matches the first encoding profile at approximately a point in time when the second compressed video stream is spliced into the first compressed video stream,
 wherein the real time encoder is further configured to control the encoding of the second video such that the second encoding profile approximately matches the first encoding profile for the first compressed video stream at approximately a point in time when the first compressed video stream is spliced back into the second compressed video stream.

12. The system of claim 11, further comprising:
 a buffer coupled to the real time encoder and the splicer and configured to receive and buffer the first compressed video stream from the real time encoder.

13. The system of claim 11, wherein the profiler is further configured to receive the second compressed video stream and provide the second encoding profile.

14. The system of claim 11, wherein the second encoding profile includes bit rate information related to the second compressed video stream.

* * * * *